No. 757,975. PATENTED APR. 19, 1904.
W. T. SNELL.
PIPE OR BAR CUTTER.
APPLICATION FILED AUG. 19, 1903.
NO MODEL.
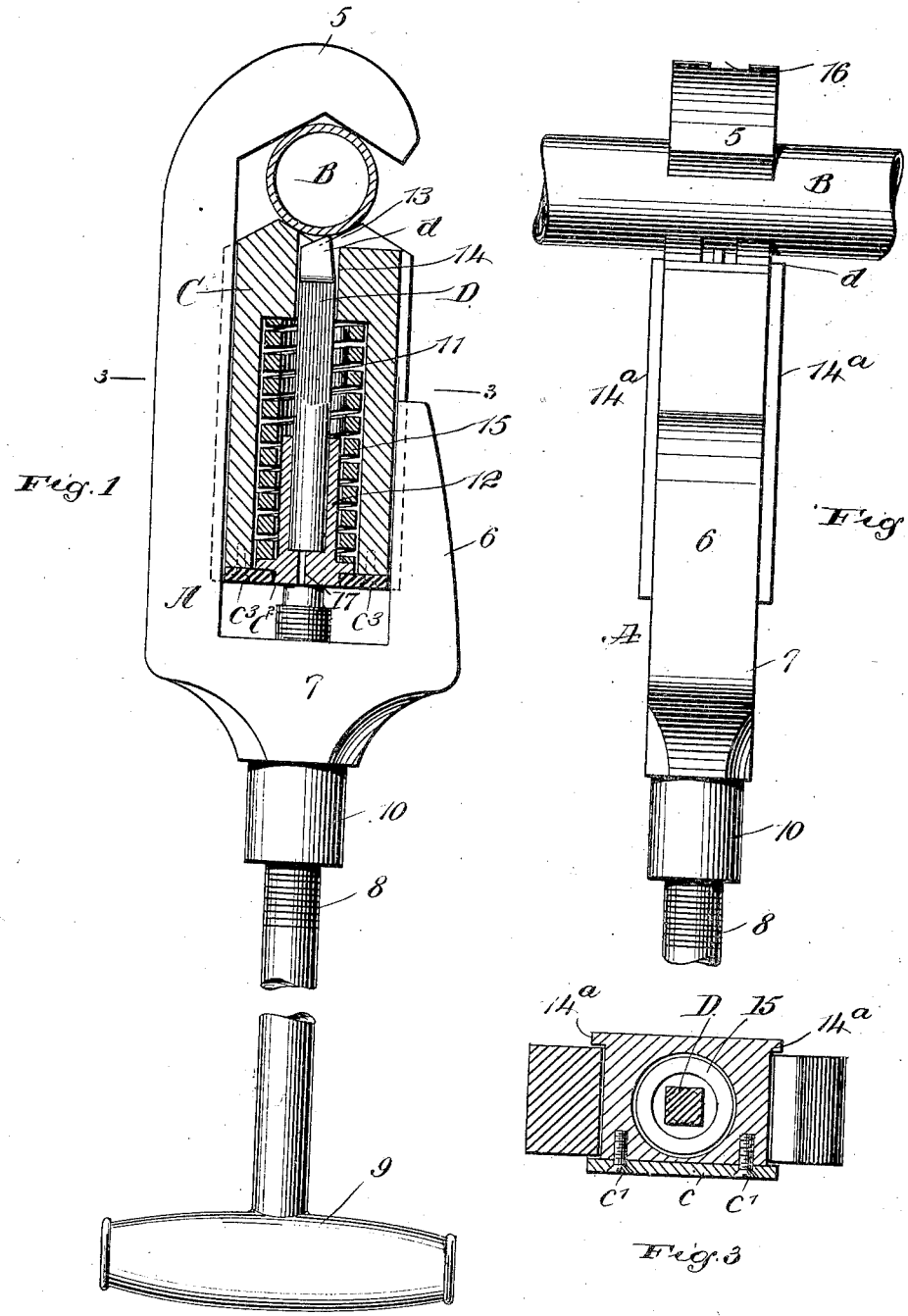
WITNESSES:
INVENTOR
William T. Snell
BY
ATTORNEYS No. 757,975. Patented April 19, 1904.

UNITED STATES PATENT OFFICE.

WILLIAM T. SNELL, OF OCTAVE, ARIZONA TERRITORY.

PIPE OR BAR CUTTER.

SPECIFICATION forming part of Letters Patent No. 757,975, dated April 19, 1904.

Application filed August 19, 1903. Serial No. 170,014. (No model.)

*To all whom it may concern:*

Be it known that I, WILLIAM T. SNELL, a citizen of the United States, and a resident of Octave, in the county of Yavapai and Territory of Arizona, have invented new and useful Improvements in Pipe or Bar Cutters, of which the following is a full, clear, and exact description.

This invention relates to certain novel and useful improvements in a cutting-tool for pipes, tubes, and bars of metal.

In carrying out the present invention I have particularly in view the provision of a cutting tool or implement which shall embody the desired and essential features of strength, durability, inexpensiveness, and simplicity.

A further object of my invention is to provide a cutting-tool which may be adjusted to fit and securely clamp any size bar or pipe while the cutting operation is being proceeded with, the arrangement of the parts being such that the size and depth of the cut made by the tool may be regulated, depending entirely upon the force or pressure exerted through the handle by the operator.

Still another object of my invention is to provide a tool which will cut bar-iron or pipe evenly and quickly, while at the same time the bulging of the pipe on the inside, which often occurs in the use of implements now in use, will be obviated, and it is unnecessary to ream out the pipe, which operation of reaming is apt to leave burs on the outside.

With the above-recited objects and others of a similar nature in view my invention consists in the construction, combination, and arrangement of parts, as is described in this specification, delineated in the accompanying drawings, and set forth in the appended claims.

Reference is to be had to the accompanying drawings, forming a part of this specification, in which similar characters of reference indicate corresponding parts in all the figures.

Figure 1 is a side view of a tool embodying my improvement, the cutter-block being shown in section to illustrate the interior formation of the same. Fig. 2 is a top side view of my improved tool, showing the manner of employing the same in cutting a pipe or bar; and Fig. 3 is a transverse sectional view taken through the cutter-block and cutter-block frame on the line 3 3 of Fig. 1.

Referring now to the accompanying drawings in detail, A designates the main body portion or frame of the tool, which is substantially rectangular in shape and is provided with a front jaw portion 5 in the nature of a hook or curve designed to engage and seat one portion of a pipe or bar, such as shown at B. The frame of the tool is also formed at one side with a member 6, which extends approximately one-half the distance of the length of the cutter-frame, so that an open space is left between the curved jaw portion of the tool and the extension 6. The rear end member 7 of the frame is bored and threaded to permit the passage of the rod 8, carrying a handle 9, said rod finding bearing in the bored portion 7 and in the hollow like extension 10, formed integral with the rear end portion 7 of the frame.

Sliding within the frame A is a jaw-block C, said jaw-block being approximately rectangular in shape and is provided with a hollow interior portion or chamber 11, into which extends the tubular stud 12, said tubular stud 12 being slightly tapered in its bore and is adapted to form a seat for the shank of the cutter D, the head *d* of the cutter being designed to extend or project a short distance beyond the outer end of the inclined central portion 13 of the block C, as the bore or passage-way 14 extends from the outer end of the block to the interior chamber 11 thereof. In order to permit the block to slide readily and easily within the frame, I have provided such block at its longitudinal edge portion with guideways 14ª, which guideways extend over and bear against the sides of the frame, as clearly seen in dotted lines in Fig. 1 and in full lines in Fig. 2, the construction being such that the block may slide and yet may be held against lateral movement or displacement. The tool, which is inserted within the tubular socket 12, has its shank portion slightly tapered, so that it will tighten itself when in use, and within the chamber formed in the block is a heavy coiled spring 15, designed to press or retain the tool and tubular stud against the bar being cut, this spring preventing the tool cutting deeper than is desired, as the amount of cutting is regulated by the pressure exerted upon the handle.

From the above description, taken in connection with the accompanying drawings, the construction and manner of using my improved cutter will be readily apparent. The tool is inserted within the socket of the block, and the pipe is engaged by the hooked jaw or end portion of the device. The block or sliding jaw may then be moved along the frame into engagement with the pipe at the opposite side to that seated in the curved end portion of of the tool through the medium of the end of the handle-rod 8, which, extending through the end portion 7 of the frame, bears against the adjacent end of the tubular stud in the movable bar or block. When the tool has been tightened to the desired degree, the cutting operation may be proceeded with, and the spring tensioning the cutter and the movable jaw or block prevents the cut from being too deep.

It will be noted, especially by reference to Figs. 1 and 3, that the moving jaw or block has a flat side piece $c$ secured thereto through the medium of screws $c'$ $c'$, while the end $c^2$ of the block, carrying the stud portion 12, is secured to the main portion of the block through the medium of similar screws $c^3$ $c^3$, the base of the tubular stud passing through the flat end face $c^2$, so that the end of the rod may bear against such stud-base and force the stud, with its tool, inward against the tension of the spring. It will also be noted that the curved end portion or stationary jaw 5 of the main body portion is provided with an aperture 16, through which the cutter may be passed to insert it in or remove it from the socket in the movable jaw. A small hole or bore 17 is made in the block to permit a pin or the like to be inserted for starting the tool from the socket.

The many advantages incident to my improved implement will be readily apparent, and it is unnecessary to dwell upon the same here in detail.

While I have shown and herein described one particular embodiment of my invention, it is of course to be understood that I do not limit myself to the precise details of construction shown herein, as there may be modifications and variations in certain respects without departing from the essential features of the invention or sacrificing any of the advantages thereof.

Having thus described my invention, I claim as new and desire to secure by Letters Patent—

1. A device of the class described, comprising a main body portion including a stationary jaw at one end thereof, a movable jaw slidable on the main body portion relative to the stationary jaw, said movable jaw having a hollow interior portion, a movable tubular socket within the hollow portion of the movable jaw, a tension-spring coiled around the socket and a cutter carried by said socket, substantially as set forth.

2. The combination with the main body portion, including a stationary jaw, of a movable jaw slidable on the main body portion but held against lateral movement, said movable jaw having a hollow interior portion, a tubular socket extending into the hollow interior portion, a cutter seated in said tubular socket and having its cutting edge extending through a bore in the movable jaw, and a handle having a rod portion threaded in the main body portion and designed to bear against the movable jaw for moving it toward the stationary jaw, the construction being such that a pipe or bar may be clamped between the movable jaw and the stationary jaw and cut with the edge of the cutter, substantially as set forth.

3. The combination of a main body portion, including a stationary jaw, a movable jaw having a hollow interior portion slidable on the main body portion toward and from the stationary jaw, said movable jaw being provided with guideways to engage with the sides of the main body portion and prevent lateral movement of the movable jaw, a tubular socket extending into the interior portion of the movable jaw, a cutter carried by said socket, a tension-spring coiled about the socket and occupying the hollow interior portion of the movable jaw, and a handle having a threaded rod portion designed to bear against the movable jaw for moving it relative to the stationary jaw, substantially as set forth.

In testimony whereof I have signed my name to this specification in the presence of two subscribing witnesses.

WILLIAM T. SNELL.

Witnesses:
R. D. MORSE,
E. REISSMANN.